Figure 1:
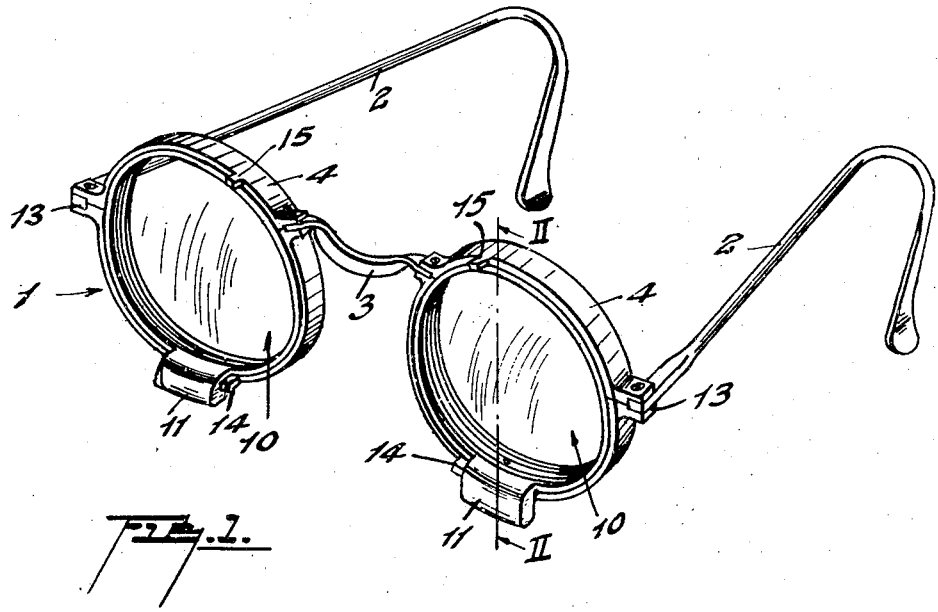

March 9, 1948.  F. C. P. HENROTEAU  2,437,642

SPECTACLES

Filed Aug. 16, 1946

INVENTOR
FRANCOIS C.P. HENROTEAU

By Smart & Biggar
ATTORNEYS.

UNITED STATES PATENT OFFICE 2,437,642

SPECTACLES

Francois Charles Pierre Henroteau,
Liege, Belgium

Application August 16, 1946, Serial No. 690,919

1 Claim. (Cl. 88—41)

This invention relates to spectacles.

Persons with certain types of eye condition, for example those in which a considerable degree of astigmatism is combined with far-sightedness, require two pairs of spectacles, one which gives the vision correction required by the wearer for close vision, i. e. distance of up to two feet or so, as required for reading and the like, and the other which gives the vision correction for distant vision, i. e. distances five to ten feet and more.

To overcome the disadvantages of having to carry two different pairs of spectacles, bifocal spectacles have been developed in which the upper part of each lens is adapted for distant vision and the lower part of the lens is adapted for close vision. Many persons, however, find the dividing line between the two types of lens in bifocal spectacles so objectionable that they prefer to carry two pairs of spectacles, as indicated above, and to alternate these as required, notwithstanding the trouble which this involves.

The spectacles of the present invention have been designed to make unnecessary the carrying of two pairs of spectacles and at the same time to avoid the objectionable features of present bifocal spectacles by providing eye pieces which may, by a simple adjustment, be adapted over their whole area for distant vision or close vision as required. Spectacles according to the invention comprise a frame having two eye pieces, at least one, and generally both of these eye pieces, comprising two lenses with a space between them. The lenses are so formed as to give in combination the vision correction required by the wearer for distant vision, and the opposing surface of these lenses which bound the space between them are of different curvatures. Associated with each eye piece so formed is a liquid chamber which has a volume at least equal to that of the space, and in the chamber is a liquid which does not wet the lenses and which has a refractive index such that, when this liquid is introduced into the space, the composite lens, which then consists of the two lenses and the liquid, gives the vision correction required by the wearer for close vision. Means is provided for causing the chamber to be emptied of the liquid and the space filled with the liquid or vice versa as desired. Preferably, the two lenses are secured in a ring and the resulting eye piece is rotatably mounted in the frame, the liquid chamber being secured to and rotatable with the eye piece through 180°. When the chamber is uppermost the liquid runs through a passage connecting the chamber to the space and fills the latter, and when the chamber is at its lowermost position, the liquid runs through the passage back into the chamber and leaves the space empty.

Figure 2:
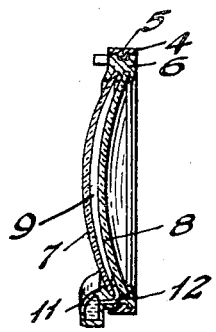
Figure 3:
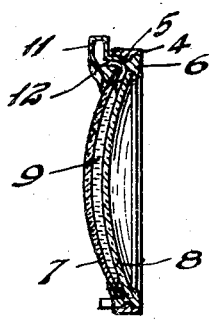

The invention will be more fully understood by reference to the attached drawings which illustrate a preferred embodiment of it and in which, Figure 1 is a perspective view of a pair of spectacles constructed according to the invention, Figure 2 is a cross section on the line II—II of Figure 1, and Figure 3 is a view corresponding to Figure 2 except that the chamber is in its extreme uppermost position.

The spectacles illustrated comprise a frame 1 with the usual side pieces 2 and nose piece 3. The lens holding members 4 are of special construction, each being provided with an internal central rib 5 designed to engage a corresponding groove on the outer surface of a ring 6 so as to secure the ring rotatably. In each ring are secured two lenses 7 and 8 with a space 9 between them, these lenses giving in combination the vision correction required by the wearer for distant vision. In the case of the eye condition referred to by way of example at the beginning of this specification, the lenses, assuming them to be of glass, would be ground to give in combination the required correction for astigmatism and the alteration of focus required for distant vision. The opposing surfaces of these lenses which bound the space 9 have different curvatures, and these lenses secured in the ring constitute the eye piece 10. Secured to and rotatable with each eye piece is a liquid chamber 11 having a volume at least as great as that of the space 9. A passage 12 connects each chamber to the space between the lenses of each eye piece. In each chamber is a liquid which does not wet the lenses and has a refractive index, preferably as nearly as possible the same as that of the material of which the lenses are formed, such that when it is introduced into the space 9, (which, owing to the different curvatures of the two surfaces bounding it, constitutes a lens), the resulting composite lens consisting of the lenses 7 and 8 and the liquid gives the vision correction required by the wearer for close vision. When the chambers 11 are in the position shown in Figures 1 and 2 then all the liquid is contained in the chambers and the spaces 9 are empty. When, however, the eye pieces 10 are rotated through 180° to bring the chambers to the position shown in Figure 3, then by means of the passages 12, the chambers 11 are emptied of liquid and the spaces 9 are filled. The chambers 11 are offset, as shown, from the lens holding members 4 so that they may clear the connections 13 between the members 4 and side pieces 2. Stops 14 and 15 are provided to limit the rotation of the eye pieces to 180°, in order that in either position of the chambers the correction for astigmatism should be the same.

The liquid used should not only be one which does not wet the lenses and has a refractive index close to that of the lens material, but should also have a boiling point and freezing point outside the range of temperatures normally encountered in the use of the spectacles. Many liquids have these characteristics, of which the following are examples:

| Liquid | Refractive Index | Freezing Point | Boiling Point |
|---|---|---|---|
|  |  | °C. | °C. |
| Carbon Tetrachloride | 1.4630 | −23 | 76.8 |
| Amyl Iodide | 1.4955 | −85.6 | 156 |
| Quinoline | 1.6245 | −19.5 | 237.7 |
| Iodo-benzene | 1.6214 | −31.4 | 188.6 |

What I claim as my invention is:

Spectacles comprising a frame having two eye pieces therein, each of said eye pieces comprising two lenses secured in a ring with a space between them, said lenses giving in combination the vision correction required by the wearer for distant vision and the opposing surfaces of said lenses bounding said space being of different curvatures, means for rotatably mounting said eye pieces in said frame, a liquid chamber secured to and rotatable with each eyepiece and having a volume at least equal to that of said space, a passage connecting each chamber to the space between the lenses in the eye piece to which it is secured, a liquid in said chamber which does not wet said lenses and has a refractive index such that, when the liquid is introduced into said space, the composite lens consisting of said two lenses and said liquid gives the vision correction required by the wearer for close vision, and stops to limit the rotation of each eye piece to 180°.

FRANCOIS CHARLES
PIERRE HENROTEAU.

REFERENCES CITED

The following references are of record in the file of this patent:

UNITED STATES PATENTS

| Number | Name | Date |
|---|---|---|
| 1,515,389 | Hopkins | Nov. 11, 1924 |

FOREIGN PATENTS

| Number | Country | Date |
|---|---|---|
| 258,325 | Great Britain | Sept. 15, 1926 |

OTHER REFERENCES

"Ophthalmic Lenses," Text Emsley & Swaine, 341 pp. Hatton Press Ltd., 1935, p. 298 and 299 especially noted. (Copy in Division 7.)